(12) United States Patent
Meyrahn et al.

(10) Patent No.: US 8,612,048 B2
(45) Date of Patent: Dec. 17, 2013

(54) ROBOTIC DEVICE FOR INSERTING OR REMOVING ROD-LIKE ELEMENTS

(75) Inventors: Joachim Meyrahn, Erzhausen (DE); Frank Niedecker, Porza (CH)

(73) Assignee: Poly-Clip System GmbH & Co. KG, Hattersheim (DE)

( * ) Notice: Subject to any disclaimer, the term of this patent is extended or adjusted under 35 U.S.C. 154(b) by 486 days.

(21) Appl. No.: 12/896,837

(22) Filed: Oct. 1, 2010

(65) Prior Publication Data

US 2011/0082584 A1 Apr. 7, 2011

(30) Foreign Application Priority Data

Oct. 2, 2009 (EP) ..................................... 09012519

(51) Int. Cl.
*G06F 7/00* (2006.01)
*G05B 19/18* (2006.01)
*G05B 15/00* (2006.01)

(52) U.S. Cl.
USPC ........... 700/215; 700/213; 700/220; 700/225; 700/250; 700/253; 700/257; 700/258; 700/259

(58) Field of Classification Search
None
See application file for complete search history.

(56) References Cited

U.S. PATENT DOCUMENTS

| | | | | |
|---|---|---|---|---|
| 5,100,364 A | * | 3/1992 | Kollross et al. | 452/185 |
| 5,468,110 A | * | 11/1995 | McDonald et al. | 414/273 |
| 6,594,544 B2 | * | 7/2003 | Nagler | 700/219 |
| 7,249,997 B2 | * | 7/2007 | Kasai | 452/51 |
| 7,269,479 B2 | * | 9/2007 | Okamoto et al. | 700/245 |
| 7,614,942 B2 | | 11/2009 | Liermann et al. | |
| 7,766,729 B2 | * | 8/2010 | Liermann et al. | 452/51 |

(Continued)

FOREIGN PATENT DOCUMENTS

| DE | 102 52 876 A1 | 6/2004 |
|---|---|---|
| EP | 1 994 829 A1 | 11/2008 |

OTHER PUBLICATIONS

EP 1 994 829 A1—English abstract and machine translation obtained from Espacenet (http://worldwide.espacenet.com) accessed on Apr. 24, 2012, 13 pages.

(Continued)

*Primary Examiner* — Khoi Tran
*Assistant Examiner* — Bao Long T Nguyen
(74) *Attorney, Agent, or Firm* — Hahn Loeser & Parks LLP (57) ABSTRACT

The present invention relates to a method and a system for controlling a robotic device for inserting or removing rod-like elements into or from a storage frame, the rod-like elements, like smoking bars, serving for storing products, like sausages, each having a sausage-shaped body and a loop for a pendulously storage of the products. The method comprises the steps of moving the storage frame into the operating range of the robotic device, picking up a rod-like element on which a number of sausage like products are hung up by the robotic device, and inserting or removing the rod-like element into or from the storage frame by the robotic device. Moreover, there is provided a storage frame with at least a machine readable label from which information regarding the storage device are read out from the machine readable label, which is attached to the storage device, at least before the storage frame is moved into the operating range of the robotic device. Said information are sent to the control unit of the robotic device for controlling the movement of the robotic device while inserting or removing rod-like elements into or from the storage frame.

14 Claims, 3 Drawing Sheets

(56) References Cited

U.S. PATENT DOCUMENTS 7,809,470 B2 * 10/2010 Shoenfeld .................... 700/243
2005/0242953 A1 11/2005 Nakagawa et al.
2006/0043197 A1 3/2006 Chang et al.

OTHER PUBLICATIONS

EP 09012519.6-2206 Extended European Search Report dated Mar. 3, 2010, 7 pages.

* cited by examiner

ROBOTIC DEVICE FOR INSERTING OR REMOVING ROD-LIKE ELEMENTS

This patent application claims priority to and the benefit of European patent application EP 09 012 519.6-2206, filed Oct. 2, 2009, which is hereby incorporated herein by reference The present invention relates to a method for controlling a robotic device according to the preamble of claim 1 and a system therefore according to the preamble of claim 9.

In particular, the present invention relates to a method for controlling a robotic device for inserting or removing rod-like elements, like smoking bars, into or from a storage frame, the rod-like elements serving for storing sausage-like products, like sausages, each having a sausage-shaped body and a loop on one end of the body for a pendulously storage of the products. The method comprises the steps of providing a movable storage frame for temporary storing rod-like elements, moving the storage frame into the operating range of the robotic device, picking up by the robotic device a rod-like element on which at least one sausage-like product is hung up, and inserting or removing the rod-like element into or from the storage frame by the robotic device. Furthermore, the invention relates to a system, for controlling a robotic device for inserting or removing rod-like elements, like smoking bars, into or from a storage frame, the rod-like elements serving for storing sausage-like products, like sausages, each having a sausage-shaped body and a loop on one end of the body for a pendulously storage of the products. The system comprises at least one movable storage frame for temporary storing rod-like elements, a robotic device for inserting or removing rod-like elements into or from the storage frame and a control unit for controlling the movement of the robotic device.

In an already known production line for producing sausage-like products, like sausages, a filling tube is provided for feeding a packing material or tubular casing, respectively, with, for example, sausage meat wherein the tubular casing is closed at one end facing in the filling direction by a first clip. After the filling operation is concluded, the tube-like casing is finally closed by a second clip. If the sausage is later to be hung up, for example for the purposes of smoking or storage, a suspension loop is fed thereto in such a way that, when the first or second clip is attached, it is embraced by the respective clip and is thus secured to the sausage. The term loops in accordance with this invention is used to denote all at least partially flexible means, by way of which articles can be hung up.

After the filling process, the sausages can be subjected to further processing, for example in a smoking chamber. For that purpose, the sausages have to be transported to the end of the conveyor and there taken over by an automatic hanging line, in which the sausages are hung up on a rod-like element, such as a smoking rod, at their loops one after another in such a way that, as far as possible, they do not touch each other. Afterwards, the smoking rods are transported to a further storage frame which has rollers for transporting the smoking rods into a smoking chamber. A robotic device is provided for removing smoking rods from the storage frame and/or inserting smoking rods into the storage frame.

A robotic device being part of an automatic sausage production line for inserting or removing rod-like elements into or from a storage frame is known from EP patent application 1 994 829.

In the production of sausage-like products, there is a great variety of machines being components of the respective production line. Said machines may vary in size, in rate of production or in size of products. Thus, they also may vary in the kind of used rod-like elements, on which the sausage-like products are to be stored and in the kind of storage frames, to which the rod-like elements are to be fed or from which they have to be removed. Even if identical rod-like elements are used, depending on the kind of sausage-like products and their further treatment, like smoking or boiling for sausages as sausage-like products, the rod-like elements together with the sausage-like products hanging thereon, have to be placed at specific positions inside a storage frame. Moreover, there is also a great variety of storage frames used. Said storage frames may be standardized, but they may also be individual produced.

Typical storage frames used in the manufacturing process for sausages have a length of about 0.80 m to 1 m, a depth of about 1.00 m and a height of 1.20 m. The tray rails or shelf rails, respectively, which are arranged at opposite side walls of the storage frame and on which the rod-like elements are to be placed, may be formed by horizontally arranged profiles of a U-formed or square cross-section. The tray rails have a predefined vertical distance in height to each other, which is normally about 0.50 m, and also a predefined height to the bottom level. The storage frame further comprises wheels or rollers, respectively, for moving the storage frame automatically or by hand.

According to the manufacturer, the storage frame may vary in size regarding the above-mentioned dimensions and/or in the diameter of the wheels used. Moreover, in use, storage frames may be damaged, individually adapted or repaired. Thus, the rails on which the rod-like elements are to be placed, may be modified and their position may be changed.

While inserting a rod-like element together with the sausage-like products hanging thereon into a storage frame, said rod-like element may butt against the storage frame since, for example, the size of said storage frame has been modified due to adaption, repair or damage. As a result thereof, the sausage-like products may fall off the smoking rod or may be destroyed.

To avoid the above described disadvantages, only one specific kind of storage frame is usable in conjunction with the robotic device. Moreover, to restore the exact dimensions of said storage frame by e.g. repairing, a damaged storage frame is very expensive.

Therefore, it is an object of the invention to provide a method and a system for controlling a robotic device for inserting and removing rod-like elements into or from a storage frame, with which the above mentioned drawbacks can be overcome and with which a correct insertion and removal of rod-like elements into or from storage frame free of damages is assured.

The aforesaid object with respect to the method for controlling a robotic device is achieved by the features of claim 1. The aforesaid object with respect to the system for controlling a robotic device is achieved by the features of claim 9. Advantageous configurations of the invention regarding the method are described in claims 2 to 8, and with regard the system in claims 10 to 14.

In the present invention, the method for controlling a robotic device for inserting or removing rod-like elements, like smoking bars, into or from a storage frame, the rod-like elements serving for storing sausage-like products, like sausages, each of which has a sausage-shaped body and a loop on one end of the body for a pendulously storage of the products, comprising the steps of providing a movable storage frame for temporary storing rod-like elements, moving the storage frame into the operating range of the robotic device, picking up by the robotic device a rod-like element on which at least one sausage-like product is hung up, and inserting or removing the rod-like element into or from the storage frame by the robotic device.

According to an embodiment of the invention, a storage frame with at least a machine readable label including information as to the storage frame is provided and said information are readout from said label, which is attached to the storage device, at least before the storage frame is moved into the operating range of the robotic device. Said information are sent to a control unit of the robotic device for controlling the movement of the robotic device while inserting or removing rod-like elements into or from the storage frame.

The information contained in said machine readable label may identify the storage frame to the control unit of the robotic device and the control unit can modify the movement of the robotic device on the basis of said information.

In a simplified case, said information stored on the machine readable label is geometrical information of the storage frame which helps the control unit to identify a special kind of storage frame. This allows the use of storage frames of different standard; for example, produced by manufactures of such storage frames or individual storage frames adapted by the user of these storage frames. Moreover, damaged frames, where a repair is not necessary, may be premeasured and said data may be transferred into the machine readable label.

The geometrical information of the storage frame, the number of storage and shape of hanging trays may be information as to the height, length and/or depth of the storage frame. Additionally or alternatively, the geometrical information as to the storage frame stored on the machine readable label is the vertical distance between the tray rails or shelf rails, respectively, of the storage frame and/or the horizontal distance between adjacent delivery positions of the rod-like elements on a tray. Moreover, the geometrical information stored on the machine readable label can alternatively or additionally the vertical height of at least one tray or shelf, respectively, of the storage frame.

In a further embodiment of the present invention, the information stored on the machine readable label is information regarding the kind of the sausage like products. Furthermore, the information can alternatively or additionally be an information as to a further treatment of the sausage-like products. Accordingly, the robotic device can move the rod-like elements to other work stations where the sausage-like products are splashed or the like, before placing them into the storage frame.

In the case, that the information stored on the machine readable label is updated in regular intervals, it is assured, that the label always contains correct information regarding e.g. the kind and dimensions of the storage frame as well as kind and/or the further treatment of the respective products.

In a preferred embodiment of the present invention, the information stored on the machine readable label is read out by a reading device at the entrance to the operating range of the robotic device preferably when the storage frame enters the operating range of the robotic device. This allows the control unit to decide whether a suitable storage frame has been delivered or not. Based on this decision, the control unit may start or stop the production of sausage like-products. It has to be noted that the read-out of the information stored in the machine readable label can be done when the storage frame has already entered the operating range of the robotic device.

Alternatively or additionally, the information stored on the machine readable label is read out by a reading device at a gripping unit of the robotic device after the storage frame has entered the operating range of the robotic device. A reading device at the gripping unit of the robotic device may be used to detect the correct filling position of the storage frame.

The information stored on the machine readable label may be read out by the reading device at the gripping unit of the robotic device each time a rod-like element is placed inside the storage frame by the robotic device. Thereby information regarding the filling status of the storage frame may be updated in regular intervals.

The information stored on the machine readable label and read out by reading device may be compared to information received from the control unit of the production unit for producing the sausage-like products. Base on the information received from the production unit, the control unit for the robotic device can coordinate the movement of the robotic device to the production status and the filling status of the production unit. In case of an error event in the production unit, the robotic device can be stopped by its control unit.

In one embodiment, a compatibility signal can be outputted by the control unit on the basis of the comparison of information received from the control unit of the production unit for producing sausage-like products and information read out from the machine readable label. By generating a compatibility signal, it can be assured that e.g. the size of the sausage-like products fits to the size of the storage frame. Otherwise an error signal may be emitted and the production unit and the robotic device may be stopped.

Moreover, it is preferable that the information stored on the machine readable label is updated in regular intervals.

In a preferred embodiment, the machine readable label is an RFID label. On RFID labels, information can reliably be stored, modified and readout. Moreover, this technique allows a wireless and contactless transmission of said information.

Depending on the information stored in the label, the robotic device can execute additional treatments to the sausage-like products stored on the rod-like elements before inserting the rod-like elements into the storage frame. Accordingly, the robotic device is easily and promptly adaptable to various of treatments to the sausage-like products.

It has to be noted that the label can have only a read-out characteristic. In order to increase the flexibility of system it is possible to provide the storage frame with a machine readable and writable label which, for example, can be a RFID label.

In a further embodiment, RFID label additional information may be written into the read/writable label while the storage frame is staying the operating range of the robotic device. In this case, a further device, subsequently arranged to the robotic device, may read said information which may identify the storage frame and/or the kind of product or its state of treatment, whereby e.g. mistakes in the further treatment of the products may be omitted.

The writing device for writing additional information can be arranged separated from the robotic device. However, it can be provided at the robotic device, for example, which is positioned at a gripping unit of the robotic device.

The writing step can occur when the storage frame is entering, staying and/or leaving the operating range of the robotic device.

Said information may also include the size or the weight of the sausage-like product stored in the storage frame, which are transmitted from the control unit to the sausage production unit to the writing unit and/or to the control unit of the robotic device.

According to the present invention, the system for controlling a robotic device for inserting or removing rod-like elements, like smoking bars, into or from a storage frame, the rod-like elements serving for storing products, like sausages, each having a sausage-shaped body and a loop on one end of the body for a pendulously storage of the products, comprises at least one movable storage frame for temporary storing rod-like elements, a robotic device for inserting or removing rod-like elements into or from the storage frame and a control unit for controlling the movement of the robotic device.

For executing the above described method, the storage frame further comprises a machine readable label including information regarding the storage frame are stored, and a reading unit for reading out said information from said machine readable label is connected to the system.

The system may further comprise additional treatment stations to which the sausage-like products stored on the rod like elements are moved by the robotic device.

The reading unit for reading out said information from said machine readable label is advantageously positioned in the region of the entrance/exit to the operating range of the robotic device.

Furthermore, it is preferable when the storage frame is not only provided with a machine readable label, but with a machine writable and readable label, for example, a RFID label. In the following, if the machine readable label is mentioned, it is indeed referred to a machine readable/writable label.

The system may further comprise a writing unit for writing information into said machine readable label. Said writing unit for may be positioned in the region of the entrance or exit of the operating range of the robotic device.

Alternatively or additionally, a reading unit may also be positioned in the region of the gripping element of the robotic device.

It may also be advantageous, that a writing unit is positioned in the region of the gripping element of the robotic device.

In a preferred embodiment, the machine readable label is attached at the outside of storage frame, to be not only readable by the reading unit, but also to be visible to a user or operator.

To avoid damages, the machine readable label is positioned in a cavity at the outside of storage frame and may additionally be covered by a protective lamination.

In the case that the system further comprises a production unit for producing sausage-like products, the control unit of the production unit may be coupled to the control unit of the robotic device to adapt the movement of the robotic device to the production cycle of the production unit.

In a further preferred embodiment or the system according to the present invention, the control unit of the production unit may be omitted and the control unit of the robotic device also controls the production unit.

The features of the system according to the present invention provide the same advantages as described in conjunction with the inventive method.

In the following, further advantages and embodiments of the inventive method and/or the inventive system are described in conjunction with the attached drawings. Thereby, the expression "left", "right", "below" and "above" are referred to the drawings in an orientation of the drawings which allows the normal reading of the reference numbers.

Figure 1:
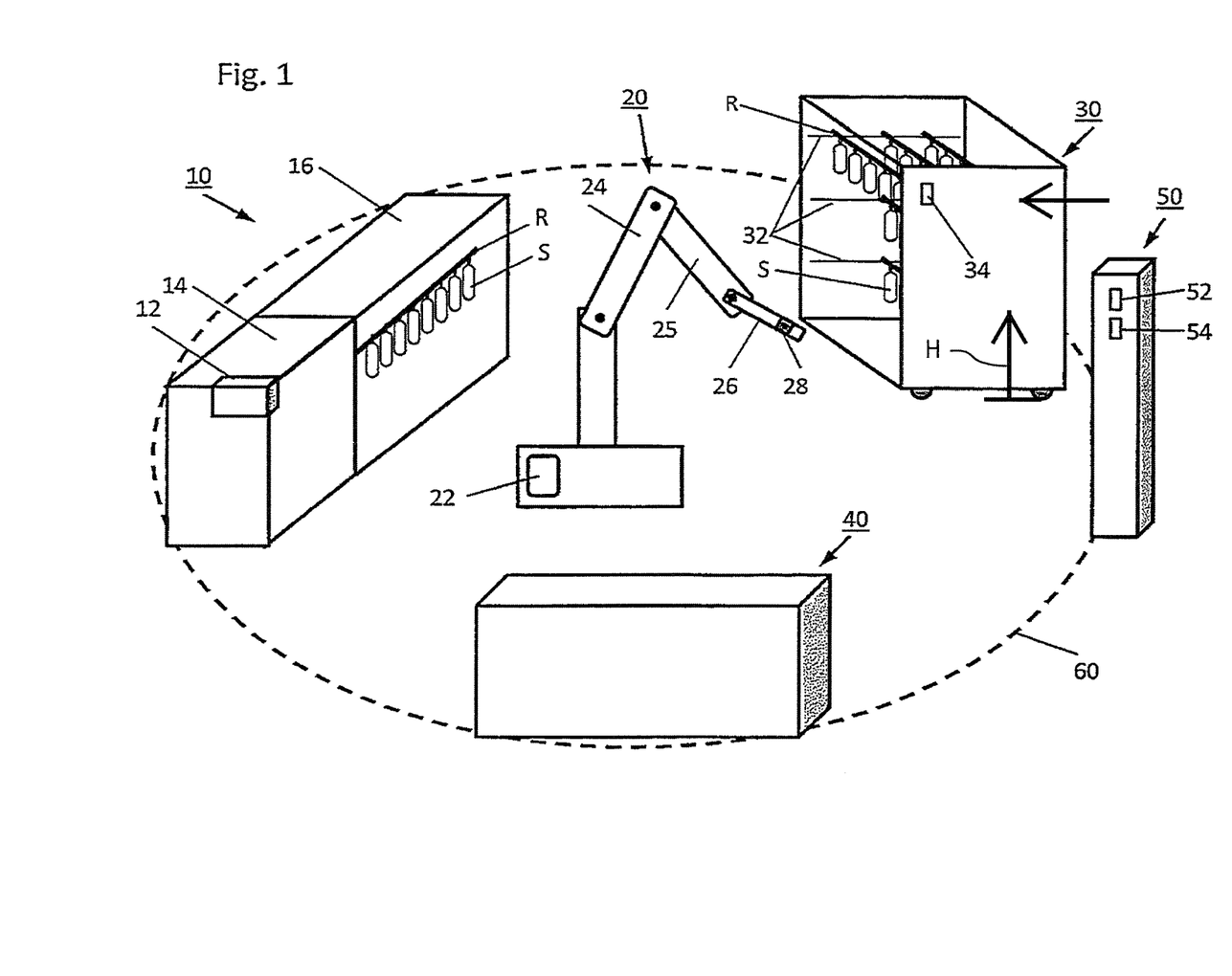
FIG. 1: is a schematically view of a system for producing and handling sausage products including a control system according to the present invention.

The system for producing and handling sausage-like products according to FIG. 1 comprises as main components a schematically shown production unit 10 for producing sausage-like products S, like sausages, and storing them on rod-like elements R, like smoking rods, including a control unit 12 for controlling the production unit 10, a robotic device 20 having a control unit 22 for controlling the movement of robotic device 20, and a storage frame 30, into which the sausages S hung up at the smoking rods R are to be moved. As shown in FIG. 1, the system for producing and handling sausage-like products S further comprises a treatment station 40, in which any possible treatment to the sausages S can be executed before they are stored in storage frame 30. A possible treatment may be splashing the sausages S with a smoking fluid or a flavoring fluid. Alternatively, additional treatment stations may belong to the system. If no treatment is necessary to the sausages S between production and storage in storage frame 30, no treatment station needs to be integrated into the system.

Storage frame 30 is positioned in an operating range 60 of robotic device 20 which is illustrated by broken lined circle 60. Inside storage frame 30, tray rails or shelf rails 32 e.g. in the form of horizontally aligned bars are arranged for positioning smoking rods R thereon. An at least machine readable label like a RFID label 34 is attached at an outside surface of storage frame 30. The label 34 can also be a read-/writable label. In the following, it the machine readable label is mentioned, it is indeed referred to a readable/writable label. RFID label 34 contains data regarding storage frame 30, like size of frame 30, vertical height H or distance of tray rails 32, or maximum number of smoking rods storable in storage frame 30 according to kind and size of sausage products S.

The system of FIG. 1 further comprises a frame element 50 positioned in the region of the entrance and exit of the operating range 60 of the robotic device 20. Frame element 50 may be part of a protective grid securing operating range 60. A reading unit 52 and a writing unit 54 for reading out data stored in an RFID label and for writing data into a RFID label are attached to frame element 50.

Robotic device 20, which is a so called joined-arm robot, is positioned in the centre of its operating range 60 to reach all units 10, 30, 40 and stations peripherally arranged inside operating range 60 by its pivotally attached arms 24, 25. At front end of arm 25, a gripping unit 26 is arranged for gripping the smoking rods R with the sausages S hanging thereon inside production unit 10 and moving it to storage frame 30. A reading and/or writing unit 28 is attached to gripping unit 26. Reading unit 28 is capable of reading data 36 stored in a machine readable label like a RFID label and/or writing information into the label 34. Control unit 22 for controlling the movement of robotic device 20 is accommodated in the housing of robotic device 20.

Production unit 10 for producing sausages S comprises a sausage production device 14 and an automatic hanging line 16. At least automatic hanging line 16 is peripherally arranged inside operating range 60. In production unit 10 sausages are produced in a known manner by filling e.g. sausage meat through a filling pipe into a tubular casing and closing the casing by a clipping machine attaching and closing clips at both ends. A flexible suspension loop is fed to one of the closing clips to be attached together with said clip to the respective end of the sausages S. Thereafter, sausages S will be placed in regular intervals at smoking rod R in automatic hanging line 16.

Figure 2:
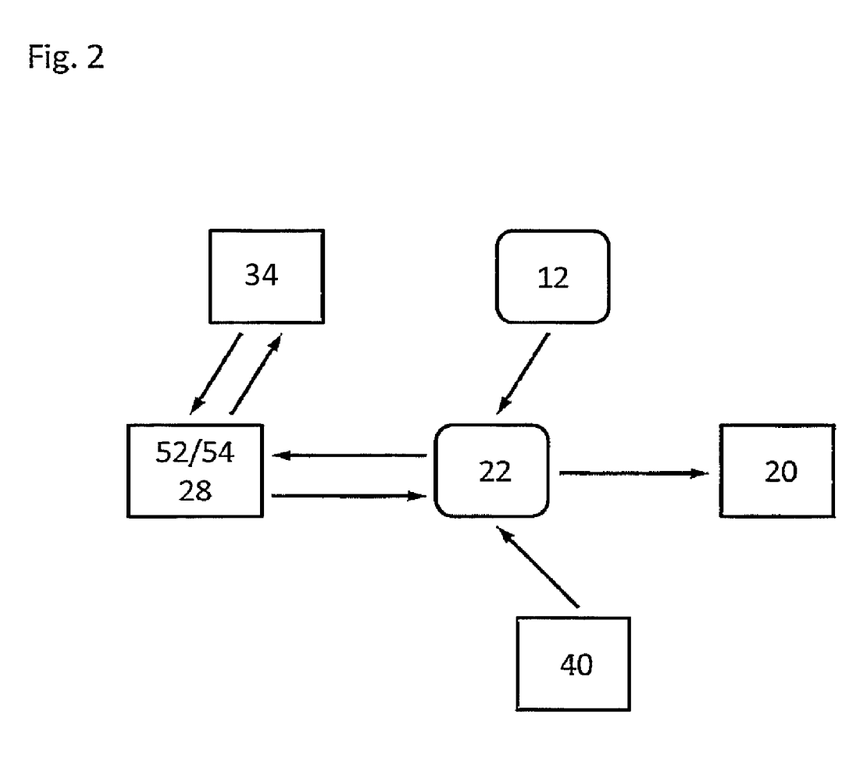
FIG. 2: is a schematically diagram of the control system according to the present invention.

FIG. 2 shows a schematically diagram of the control system according to the present invention, on the basis of which the function of the control system and the method, both according to the invention will be described.

Figure 3:
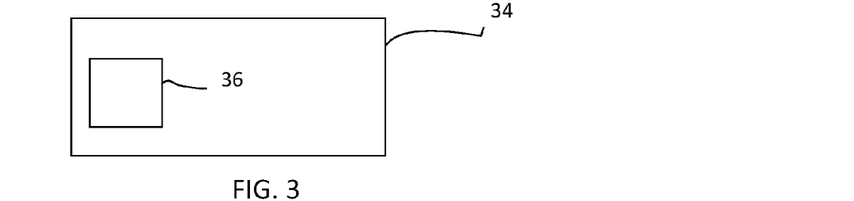
FIG. 3: is a schematic illustration of the information data contained in the label according to the present invention, in accordance with a particular embodiment of the invention; and, FIG. 4: is a flowchart of a method of for controlling a robotic device for inserting or removing rod-like elements into or from a storage frame, in accordance with a particular embodiment of the invention.

FIG. 3 shows schematically the information data 36 contained in the label 34.

Figure 4:
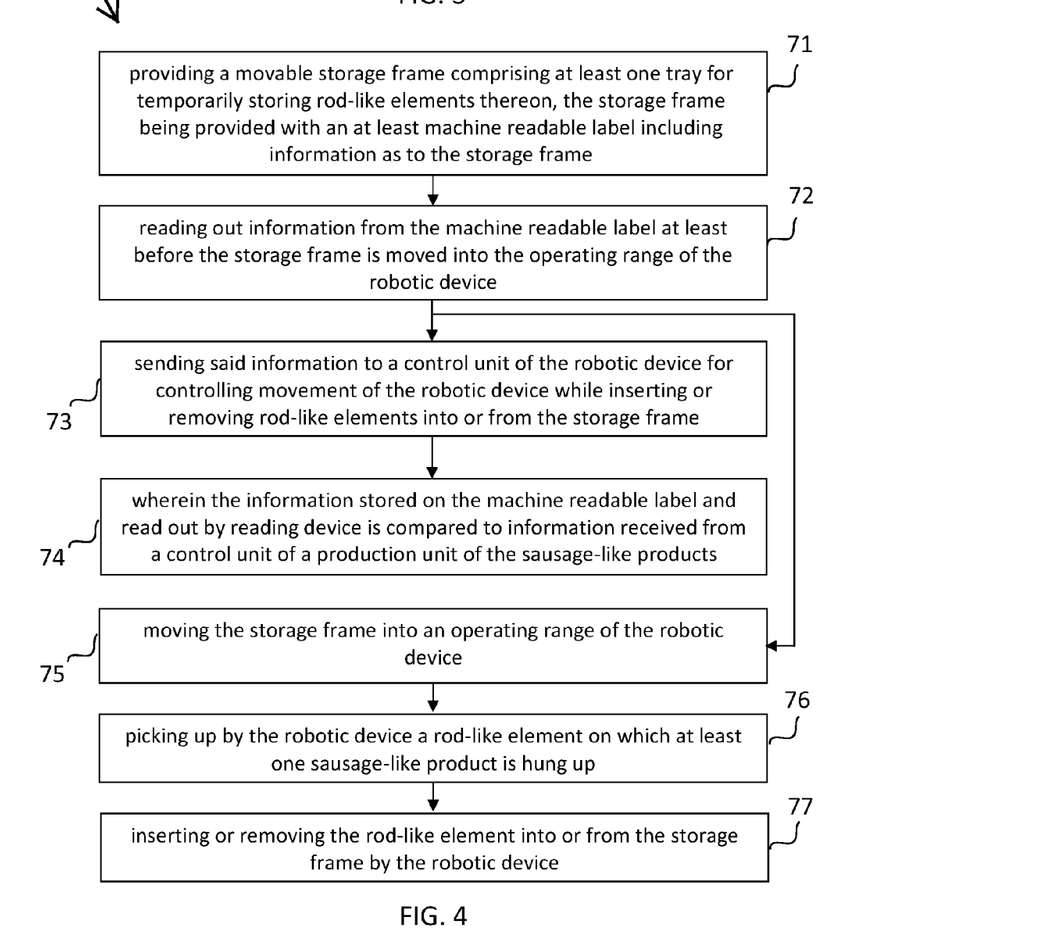

FIG. 4 shows in a flowchart a method 70 for controlling a robotic device for inserting or removing rod-like elements into or from a storage frame, the rod-like elements adapted for storing sausage-like products each of which has a sausage-shaped body and a loop on one end of the body for a pendulously storage of the products, the method comprising the steps of:

providing a movable storage frame comprising at least one tray for temporarily storing rod-like elements thereon, the storage frame being provided with an at least machine readable label including information as to the storage frame 71;

reading out information from the machine readable label at least before the storage frame is moved into the operating range of the robotic device 72;

sending said information to a control unit of the robotic device for controlling movement of the robotic device while inserting or removing rod-like elements into or from the storage frame 73, wherein the information stored on the machine readable label and read out by reading device is compared to information received from a control unit of a production unit of the sausage-like products 74;

moving the storage frame into an operating range of the robotic device 75;

picking up by the robotic device a rod-like element on which at least one sausage-like product is hung up 76; and, inserting or removing the rod-like element into or from the storage frame by the robotic device 77.

First of all, it has to be noted that a transfer of data between a RFID label 34 and a read or write unit will be done by wireless transmission. Control units 12, 22 of sausage production unit 10 and robotic device 20 as well as reading and writing units 28, 52, 54 may be coupled to each other by a wireless connection. Since control units 12, 22 and reading and writing units 28, 52, 54 are locally arranged, also respective control lines may be provided for connecting said units 12, 22, 28, 52, 54.

A smoking operation is executed to the sausages S while they are hanging on smoking rods R, which are stored in a storage frame 30, which will be placed in a smoking chamber (not shown). To avoid unnecessary handling operations, said sausages S will be directly hung up on smoking rods R in the automatic hanging line 16, which is coupled to the sausage production device 14. The number of sausages S to be hung up on one smoking rod R depends on the size of the sausages S. If a predetermined number of sausages S is placed at smoking rod R robotic device 20 grips smoking rod R and moves it to rails of a tray 32 inside storage frame 30. If a storage frame 30 is filled with smoking rods R, it is moved for further treatment to e.g. to the smoking chamber.

While an empty storage frame 30 is moved into operating range 60 of robotic device 20, it passes frame element 50. Thereby, reading unit 52 accommodated in frame element 50 reads data from RFID label 34 of storage frame 30. In a simple case, said data comprising an identification of the kind of storage frame. Additionally, geometrical data as to the length, height and/or depth of storage frame 30 or data regarding the size, the number and vertical distance H of tray rails 32 and the number and horizontal distance of smoking rods to be stored on a tray rail 32 in the storage frame and the tray rails 32 on which smoking rods are to be placed according to the size, in particular the length, of sausage products S may be contained in RFID label 34.

Data, read out by reading unit 52, are sent to control unit 22 of robotic device 20. Based on said data, control unit 22 controls the movement of robotic device 20. Moreover, control unit 22 may also receive data from control unit 12 of production unit 10. Data sent from control unit 12 may comprise information to the status of production as well as information regarding the size and weight of the sausages S, number of sausages S per smoking rod R, necessary horizontal and vertical distance between two smoking rods R according to the size of the sausages S and the like. Control unit 22 includes said data received from control unit 12 into the control of movement of robotic device 20.

Date read out from RFID label 34 and data received from control unit 12 of production unit 10 may be compared by control unit 22. If said data fit to each other, e.g. if the size of the sausages fit to the geometrical data of storage frame 30, control unit 22 may output a compatibility signal to start or continue the production of sausages. On the other hand, if said data do not match, a compatibility signal can stop the sausage production and the movement of the robotic device 20.

If a signal is sent from control unit 12 to control unit 22, which notifies, that a smoking rod R is filled with a predetermined number of sausages S, control unit 22 causes robotic device 20 to move towards the automatic hanging line 16 and to grip the respective smoking rod R. After gripping smoking rod R, robotic device 20 moves smoking rod R into storage device 30 and places it at a position on the rails of a tray 32 according to the size of the sausage products S hanging on smoking rod R and the position and number of rods R already placed inside storage frame 30.

After storage frame 30 is completely filled with sausages S hanging on smoking rods R, storage frame 30 is moved out of the operating range 60. Thereby, storage frame passes frame element 50, which is positioned in the region of the entrance/exit of the operating range 60 of the robotic device 20. Reading unit 52 accommodated in frame element 50 reads data from RFID label 32 at storage frame 30 and approves, that storage frame 30 has left operating range 60 of the robotic device 20. As long as reading unit 52 does not detect storage frame 30 leaving operating range 60 after control unit 22 has confirmed that storage frame 30 has been filled, a safety signal may be provided preventing robotic device 20 from any movement. On the other hand, if no storage frame 30 has entered operating range 60 and thus, it has not been detected by reading unit 52, movement of robotic device 20 can be stopped by control unit 20.

The RFID label 34 is attached at the outside of storage frame 30. To prevent RFID label 34 from damage, a cavity may be provided at the outside of a wall element of storage frame 30 in which RFID label 34 is attached. Additionally, a protecting lamination may cover RFID label 34. To protect RFID label 34 against damage, it is also possible to place it inside storage frame 30.

Simultaneously, writing unit 54 writes information into RFID label regarding the kind and number of sausages and the subsequent treatment steps received from control unit 12 of production unit 10 into RFID label 32. Said information may be read by a reading device at the subsequent treatment station to ensure, that correct products are at the right treatment station and in case of e.g. smoking chambers of different sizes, whether size of storage frame 30 fits to the respective smoking chamber.

In the case that an additional treatment station 40 is integrated into the present system inside operating range 60 of robotic device 20, control unit 22 may receive information regarding the additional treatment from control unit 12 of production unit 10. Said information will be included into the controlling of movement of robotic device 20. The additional treatment may comprise a single step at the additional treatment station 40 or a number of subsequent steps at station 40. Moreover, other additional stations may be provided inside operating range 60. As long as control unit 22 receives the respective information, each sequence of treatment steps at the additional treatment stations may be executed by robotic device 20.

Alternatively or additionally to reading unit 52, an additional reading unit 28 may be attached to the gripping unit 26 of robotic device 20. In this configuration, it is possible to the reading unit 28 to read data from RFID label 34 each time the robotic device 20 places a smoking rod into storage device 30.

It is further possible to include a writing unit into the gripping device 26 or robotic device 20. This configuration allows omitting frame element 50 together with reading unit 52 and writing unit 54. A storage frame 30 entering operating range 60 of robotic device 20 is in this case detected by robotic device 20, itself. Robotic device 20 can also detect the position of storage frame 30, which is thereby included in the control of movement of robotic device 20 by control unit 22.

In the case that a storage frame 30 is damage accidentally during transportation or has been adapted to new transportation devices or the position of the tray rails 32 has been changed, storage frame 30 may be measured again and new data may be stored in the RFID label 34. Next time storage frame 30 is moved into operating range 60 of robotic device 20, said data are read by reading unit 52 and transmitted to control unit 22 of robotic device 20 and control unit 22 adapts the movement of robotic device 20 to the new size of storage device 30.

Measuring the storage frame 30 may be executed automatically in regular intervals, e.g. each day or ones a week. Additionally, measuring the storage frame 30 should be done after a repair of a damaged storage frame.

The machine readable label 34 has been described as RFID label 34 and the reading and writing units 28, 52, 54 as comprising the respectively reading and writing technique. It is also possible to the label 34 to be any other kind of machine readable/writable label as barcodes, smart labels, chip card, tags or any other suitable electronical or optical technology. In the case that a "read only" technology is used, writing unit 54 may be omitted.

In the case that the rails of trays 32 of the storage device 30 are U-formed profiles, the ends of said U-shaped profiles may be closed e.g. by vertically arranged supports of storage frame 30. In order to place smoking rods by their ends inside said U-shaped trays 32, one of arms 24, 25, 26 of robotic device 20, which is a joined-arm robot, has to execute at least a partially rotation about a vertical axis into one direction, moving smoking rod R into storage frame 30 and thereafter, executing the same at least partially rotation about said vertical axis into the opposite direction.

All data, which are storable on label 34, can be transmitted by a suitable writing unit, which is coupled to e.g. a computer terminal. In one embodiment of the present system, a respective computer for inputting said data into RFID-label 34 is coupled to the system as an additional terminal. It is also possible to integrate such a computer into control units 12 or 22 of sausage production unit 10 or robotic device 20.

Based on the above described controlling method, it is also possible to integrate further robotic devices into the present system, wherein the control units of the robotic devices communicate with each other to coordinate the movement of the various robotic devices. If one additional treatment station is positioned inside the operating range of the at least two robotic devices, a first robotic device can take the smoking rods filled with sausage products out of the production unit and put them into the treatment station, whereas the respective second robotic device at the same time removes the rods from the treatment station and places them inside the storage device.

The invention claimed is:

1. A method for controlling a robotic device for inserting or removing rod-like elements into or from a storage frame, the rod-like elements adapted for storing sausage-like products each of which has a sausage-shaped body and a loop on one end of the body for a pendulously storage of the products, comprising the steps of:
   providing a movable storage frame comprising at least one tray for temporarily storing rod-like elements thereon,
   moving the storage frame into an operating range of the robotic device,
   picking up by the robotic device a rod-like element on which at least one sausage-like product is hung up, and
   inserting or removing the rod-like element into or from the storage frame by the robotic device, where the storage frame is provided with an at least machine readable label including information as to the storage frame, the method further including the steps of reading out information from the machine readable label at least before the storage frame is moved into the operating range of the robotic device and sending said information to a control unit of the robotic device for controlling movement of the robotic device while inserting or removing rod-like elements into or from the storage frame, and wherein the information stored on the machine readable label is geometrical information of the storage frame including at least vertical height of the at least one tray.

2. The method according to claim 1,
   wherein the information stored on the machine readable label is information regarding a kind and a further treatment of the sausage-like products.

3. The method according to claim 1,
   wherein the information stored on the machine readable label is read out by a reading device at an entrance to the operating range of the robotic device.

4. The method according to claim 1,
   wherein the information stored on the machine readable label is read out by a reading device at a gripping unit of the robotic device after the storage frame has entered the operating range of the robotic device.

5. The method according to claim 1,
   wherein the information stored on the machine readable label is read out by a reading device at a gripping unit of the robotic device each time a rod-like element is placed in a storage frame by a robotic device.

6. The method according to claim 1,
   wherein the information stored on the machine readable label and read out by reading device is compared to information received from a control unit of a production unit of the sausage-like products.

7. The method according to claim 1,
wherein the robotic device executes additional treatments to the sausage-like products stored on the rod like elements before inserting the rod-like elements into the storage frame.

8. The method according to claim 7,
wherein additional information is written into a RFID label by a writing device while a storage device is staying in the operating range of the robotic device.

9. A system for controlling a robotic device for inserting or removing rod-like elements into or from a storage frame, the rod-like elements serving for storing sausage-like products each having a sausage-shaped body and a loop on one end of the body for a pendulously storage of the products, the system comprising:
   at least one movable storage frame comprising at least one tray for temporary storing rod-like elements,
   a robotic device for inserting or removing rod-like elements into or from the storage frame, and
   a control unit for controlling movement of the robotic device, and
where the storage frame further comprises an at least machine readable label including information as to the storage frame, and that a reading unit for reading out said information from said machine readable label is connected to the system, and that the information stored on the machine readable label is geometrical information of the storage frame including at least a vertical height of the at least one tray.

10. The system according to claim 9,
wherein the system further comprises at least one additional treatment station to which the sausage-like products stored on the rod like elements are moved by the robotic device.

11. The system according to claim 9,
wherein the reading unit for reading out said information from said machine readable label is positioned at an entrance/exit to the operating range of the robotic device.

12. The system according to claim 11,
wherein a writing unit for writing information into a machine read-/writable label is provided.

13. The system according to claim 12,
wherein the writing unit for writing information into said machine read-/writable label is positioned at the entrance/exit to the operating range of the robotic device.

14. The system according to claim 9,
wherein the reading unit and/or a writing unit is positioned in a region of a gripping element of the robotic device.

\* \* \* \* \*